(12) United States Patent
Mueller et al.

(10) Patent No.: US 7,628,268 B2
(45) Date of Patent: Dec. 8, 2009

(54) DEVICE AND METHOD FOR DISPLACING GAS TURBINES, ESPECIALLY DURING MAINTENANCE THEREOF

(75) Inventors: Peter-Max Mueller, Celle (DE); Detlef Renner, Hattorf/Harz (DE)

(73) Assignee: MTU Aero Engines GmbH, Munich (DE)

( * ) Notice: Subject to any disclaimer, the term of this patent is extended or adjusted under 35 U.S.C. 154(b) by 10 days.

(21) Appl. No.: 10/554,475

(22) PCT Filed: Mar. 29, 2004

(86) PCT No.: PCT/DE2004/000654

§ 371 (c)(1),
(2), (4) Date: Jun. 7, 2006

(87) PCT Pub. No.: WO2004/096676

PCT Pub. Date: Nov. 11, 2004

(65) Prior Publication Data

US 2006/0266618 A1 Nov. 30, 2006

(30) Foreign Application Priority Data

Apr. 27, 2003 (DE) ................. 103 19 016

(51) Int. Cl.
*B65G 49/00* (2006.01)
(52) U.S. Cl. .................. 198/867.13; 198/867.01; 198/465.1; 198/465.3; 198/797
(58) Field of Classification Search ............ 198/867.13, 198/867.01, 465.1, 465.3, 797, 798, 800
See application file for complete search history.

(56) References Cited

U.S. PATENT DOCUMENTS

| | | | | | |
|---|---|---|---|---|---|
| 2,861,672 | A | * | 11/1958 | Buhrer et al. | 198/475.1 |
| 4,067,437 | A | * | 1/1978 | Frantl et al. | 198/800 |
| 4,856,081 | A | * | 8/1989 | Smith | 455/151.4 |
| 5,465,827 | A | * | 11/1995 | Nakagawa et al. | 198/465.3 |
| 6,256,868 | B1 | | 7/2001 | Sugito et al. | 29/711 |
| 6,640,958 | B2 | * | 11/2003 | Postlmayr | 198/321 |
| 2001/0002645 | A1 | | 6/2001 | Ito et al. | 198/341.05 |

FOREIGN PATENT DOCUMENTS

| | | |
|---|---|---|
| DE | 690 15 461 T2 | 5/1995 |
| DE | 694 01 958 T2 | 6/1997 |
| EP | 0 404 038 B1 | 12/1994 |
| EP | 0 708 877 B1 | 3/1997 |
| EP | 1 106 541 | 6/2001 |
| FR | 2 444 535 | 7/1980 |
| FR | 2616134 A1 * | 12/1988 |
| JP | 57131628 A * | 8/1982 |
| JP | 02033026 A * | 2/1990 |
| WO | WO 95/02751 | 1/1995 |

\* cited by examiner

*Primary Examiner*—Mark A Deuble
(74) *Attorney, Agent, or Firm*—Davidson, Davidson & Kappel, LLC

(57) ABSTRACT

A device is provided for displacing gas turbines, especially during maintenance thereof. The device comprises several transporter platforms which are arranged behind each other. At least one gas turbine can be positioned on each of the transporter platforms. The or each gas turbine can be displaced by displacing the transporter platforms.

21 Claims, 9 Drawing Sheets

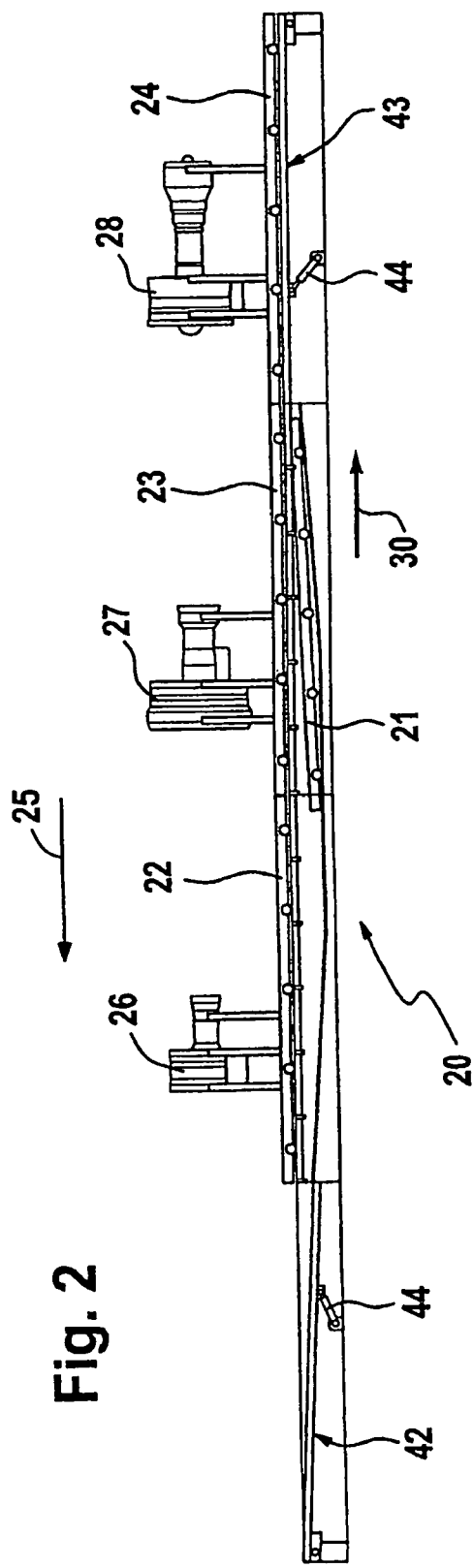
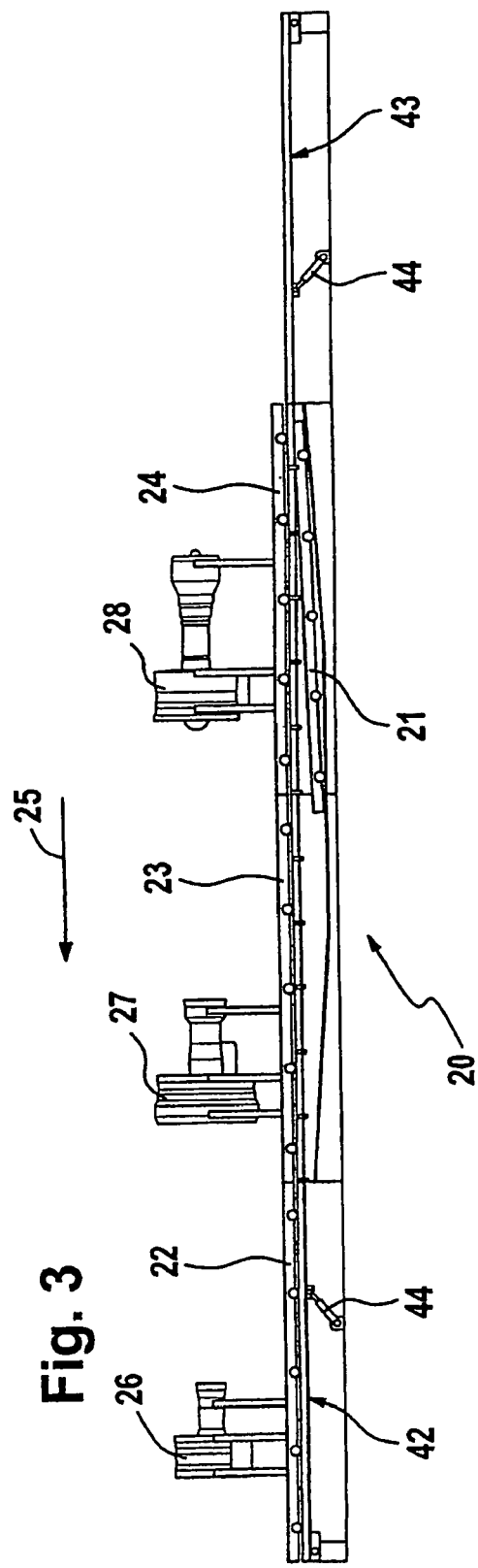

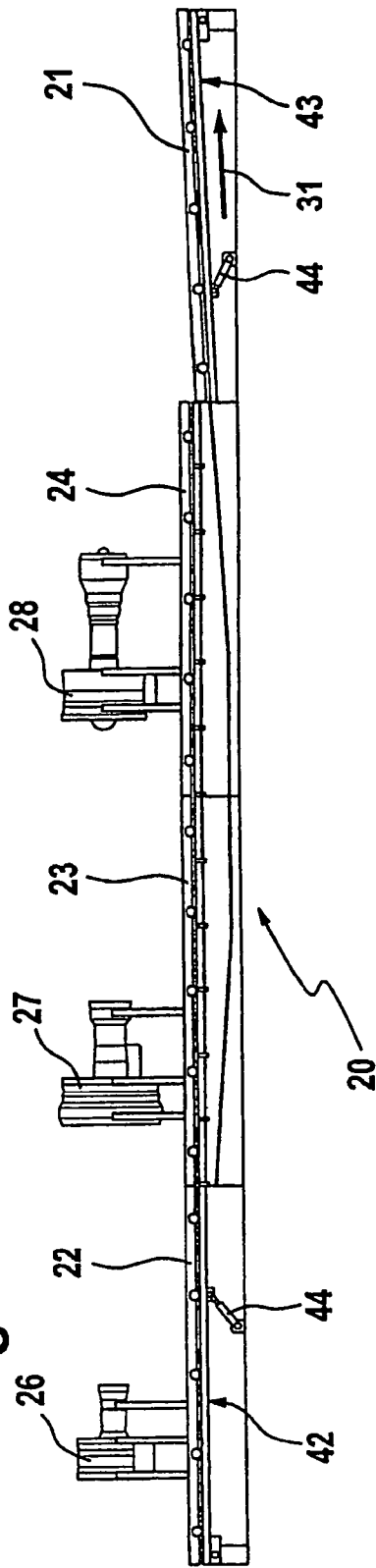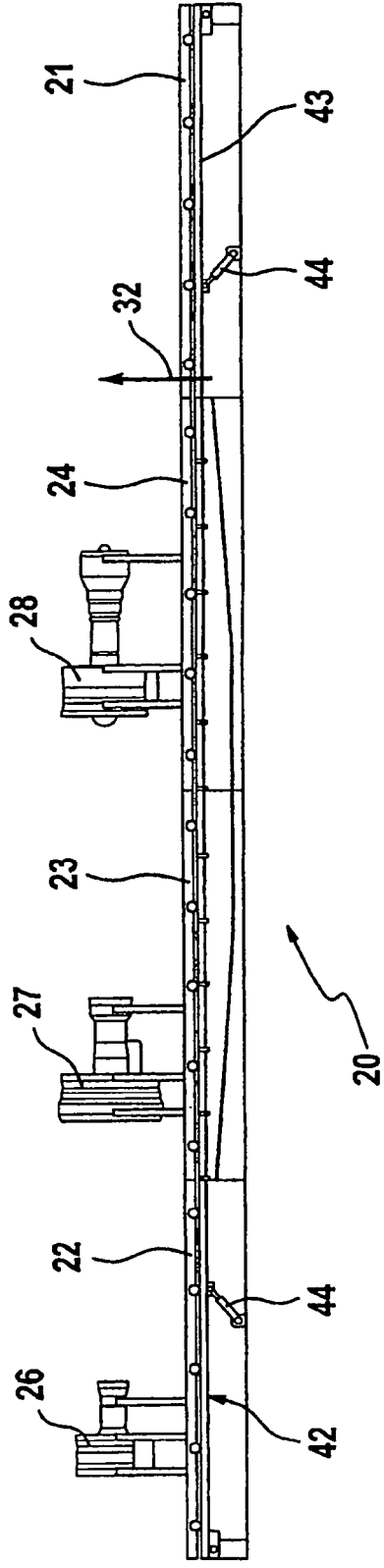

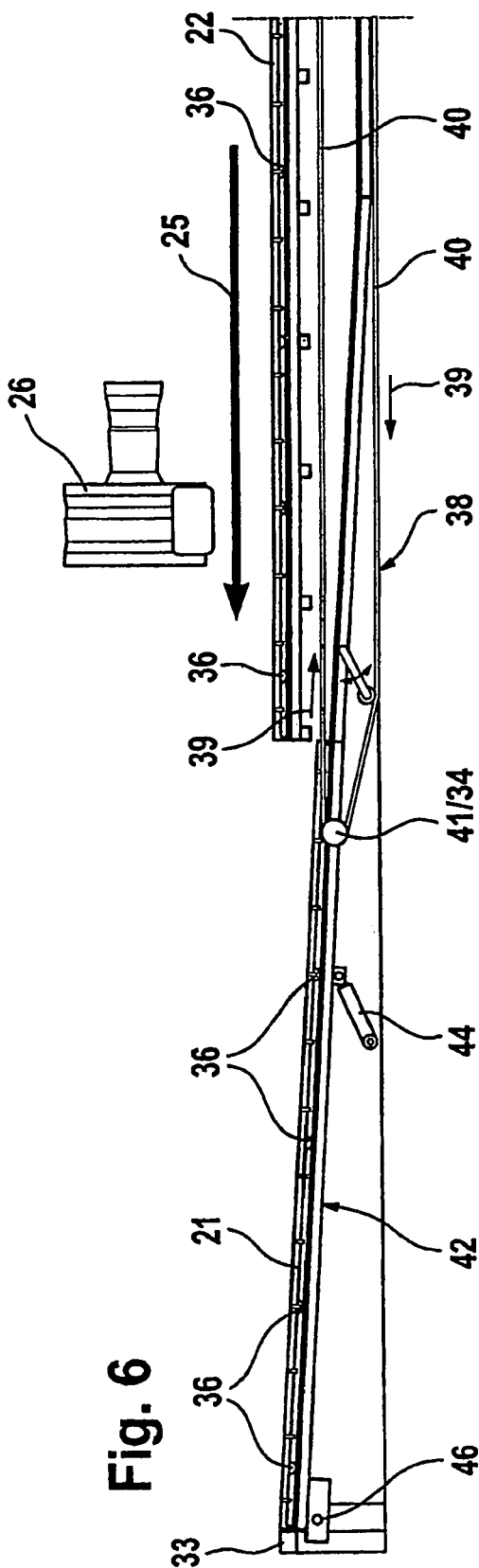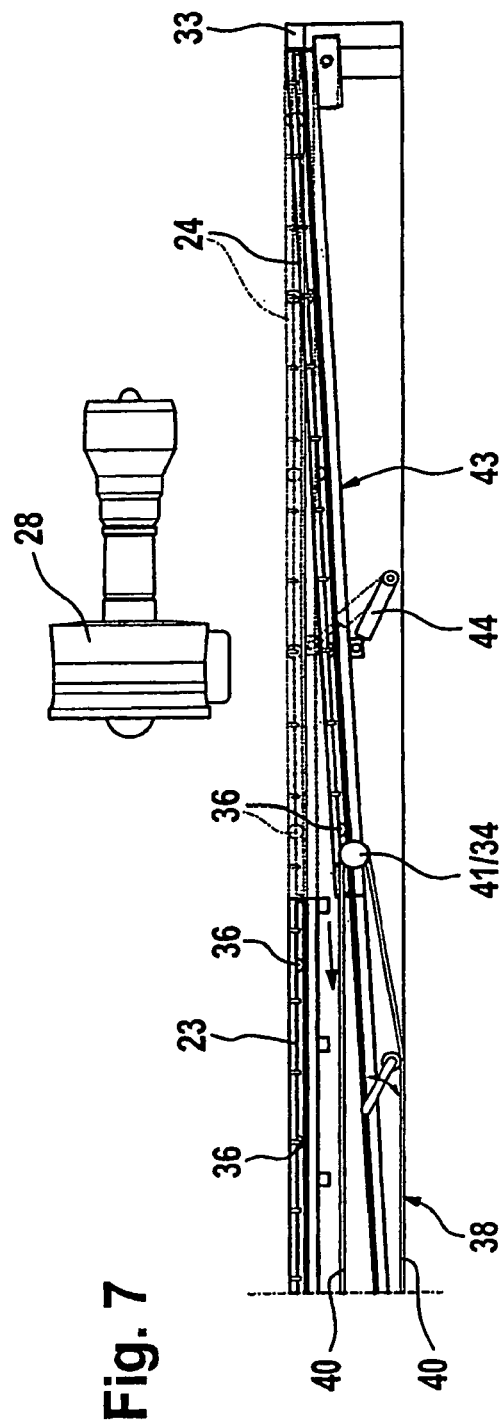
Fig. 6
Fig. 7

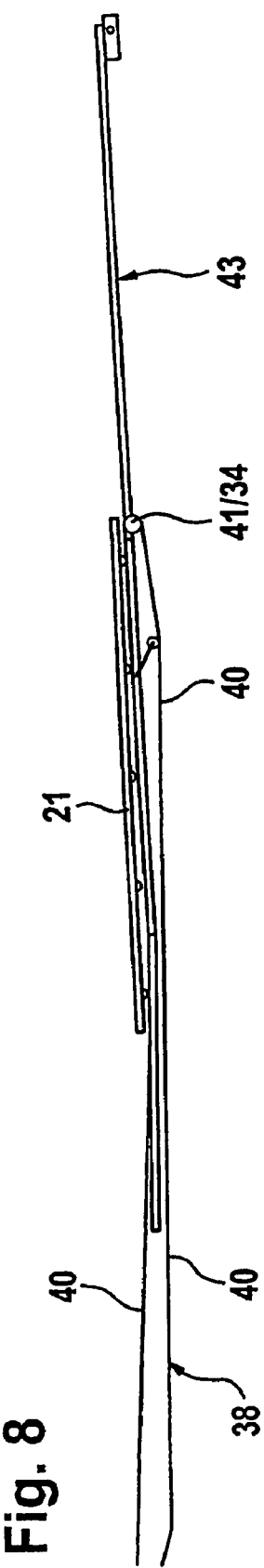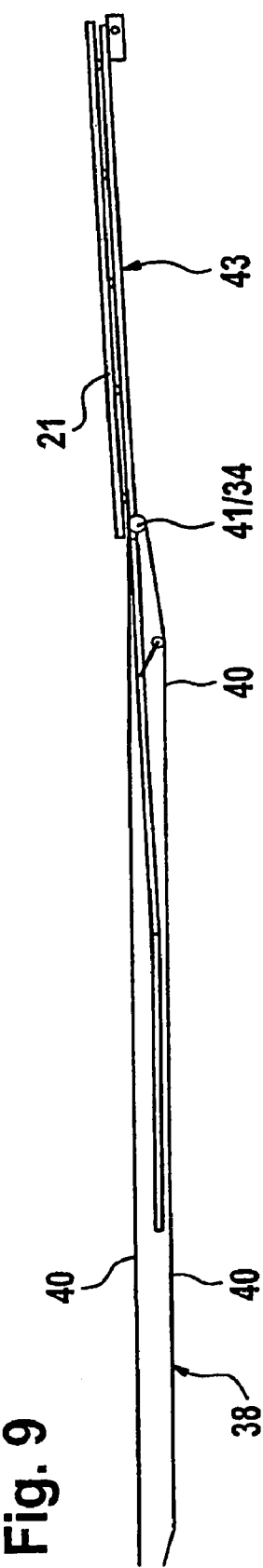

DEVICE AND METHOD FOR DISPLACING GAS TURBINES, ESPECIALLY DURING MAINTENANCE THEREOF

FIELD OF THE INVENTION

The present invention relates to a device for displacing gas turbines, i.e., aircraft engines or stationary gas turbines, or modules of a gas turbine, in particular during maintenance of same, and the corresponding method.

BACKGROUND

The maintenance and servicing, in particular repair, of gas turbines, in particular of aircraft engines, have a decisive role in determining the direct operating costs of an airplane. Thus, approximately 30% of the direct operating costs of an airplane is attributable to the aircraft engines, approximately one-third of the operating costs relating to the engines being due to the maintenance of the aircraft engines. The maintenance costs of aircraft engines are therefore responsible for approximately 10% of the total direct operating costs of an airplane. The direct consequence of this is that efficient and cost-effective maintenance and servicing/repair of aircraft engines is of decisive importance for airlines. Similar reasoning also applies to stationary gas turbines.

To date, maintenance and servicing of gas turbines, in particular of aircraft engines, have been performed according to the workshop principle. According to the workshop principle, at least portions of the gas turbine or aircraft engine remain in one position, i.e., in one location. Necessary work materials, tools, and personnel are brought to the gas turbine in a timely manner, so that disturbances are kept to a minimum, and a promised maintenance time is able to be observed.

However, the maintenance or servicing of gas turbines, in particular of aircraft engines, according to the workshop principle has the disadvantage that maintenance does not follow a defined process structure. Instead, work on gas turbines, i.e., on the aircraft engine, is performed in almost any desired sequence, which results in disturbances and delays during servicing, in particular when a plurality of gas turbines is serviced simultaneously. Therefore, maintenance of gas turbines according to the workshop principle has the disadvantage that not only is there no clear process structure, but also long times are needed for servicing and maintenance. This has a negative effect on maintenance efficiency.

Efficient displacement is also desirable in the manufacture of new gas turbines.

SUMMARY OF THE INVENTION

On this basis, an object of the present invention is to provide a novel device and a novel method for displacing gas turbines, in particular aircraft engines.

The present invention provides a device for displacing gas turbines, in particular during maintenance thereof. The device according to the present invention has a plurality of consecutive conveying platforms, at least one gas turbine being positionable on each conveying platform, and the or each gas turbine being displaceable by displacing the conveying platforms.

The device according to the present invention for displacing gas turbines, in particular during maintenance thereof, allows maintenance or servicing of gas turbines to be performed according to an assembly line principle. It is a basic finding of the present invention that the assembly line principle is also suitable for maintenance work or servicing work on gas turbines. The device according to the present invention makes high efficiency and short maintenance times possible when servicing gas turbines. The device according to the present invention may also be used in the manufacture of new aircraft engines.

According to an advantageous refinement of the present invention, the device according to the present invention has a first drive device to move the conveying platforms preferably together with the gas turbines positioned on the conveying platforms, and a second drive device to move the conveying platforms in a direction opposite to a main conveying direction of the gas turbines. This design of the device according to the present invention is particularly simple and permits reliable conveyance of the aircraft engines.

The device according to the present invention is preferably embedded into a floor of a workshop in such a way that the plane in which the conveying platforms lie in a resting condition lies in the plane of the floor so that the conveying platforms are accessible without impediment. This is particularly advantageous from a safety standpoint.

According to an advantageous embodiment of the present invention, each conveying platform has a mounting area for an adapter, the adapter being mountable in the mounting area and being adaptable to different types of gas turbines. This ensures that different types of gas turbines are movable through the consecutive work stations.

The method according to the present invention comprises positioning a gas turbine or gas turbine module on one or more of a plurality of conveying platforms, and moving the conveying platforms in a main direction of conveyance through a plurality of consecutive work stations in such a way that each gas turbine or gas turbine module is moved by the movement of the conveying platforms.

BRIEF DESCRIPTION OF THE DRAWINGS

An exemplary embodiment of the present invention is described with reference to the drawing without being restricted thereto. In the drawing.

FIG. 2 shows the device of FIG. 1 in a second state;

FIG. 3 shows the device of FIGS. 1, 2 in a third state;

FIG. 4 shows the device of FIGS. 1 through 3 in a fourth state;

FIG. 5 shows the device of FIGS. 1 through 4 in a fifth state;

FIG. 6 shows a schematic side view of an enlarged detail of the device of FIGS. 1 through 5;

FIG. 7 shows a schematic side view of another enlarged detail of the device of FIGS. 1 through 5;

FIG. 8 shows a schematic side view of another enlarged detail of the device of FIGS. 1 through 5;

FIG. 9 shows the detail of FIG. 8 in a second state;

DETAILED DESCRIPTION

The device according to the present invention and the method according to the present invention for displacing gas turbines is described in greater detail below with reference to FIGS. 1 through 17, using the example of aircraft engines. The device of the present invention is used for conveying, i.e., transporting, aircraft engines or aircraft engine modules for their maintenance or servicing.

It should be pointed out again that the device and method according to the present invention may also be used in the manufacture of new gas turbines, in particular of aircraft engines.

Servicing or maintenance includes the disassembly of the aircraft engine into modules and/or subassemblies and/or individual parts, inspection, and, if necessary, repair of the modules and/or subassemblies and/or individual parts and subsequent assembly of an aircraft engine from inspected and/or repaired and/or new modules and/or subassemblies and/or individual parts. The device according to the present invention is particularly well suited for displacing aircraft engines during disassembly of aircraft engines into modules, as well as for assembling an aircraft engine from modules. The device according to the present invention may, however, also be used in disassembling and assembling modules or subassemblies of the aircraft engine. It is also conceivable to use such a device in the actual repair.

The principle of the device according to the present invention and the method according to the present invention for displacing aircraft engines during their maintenance will first be described below with reference to FIGS. 1 through 5.

Figure 1:
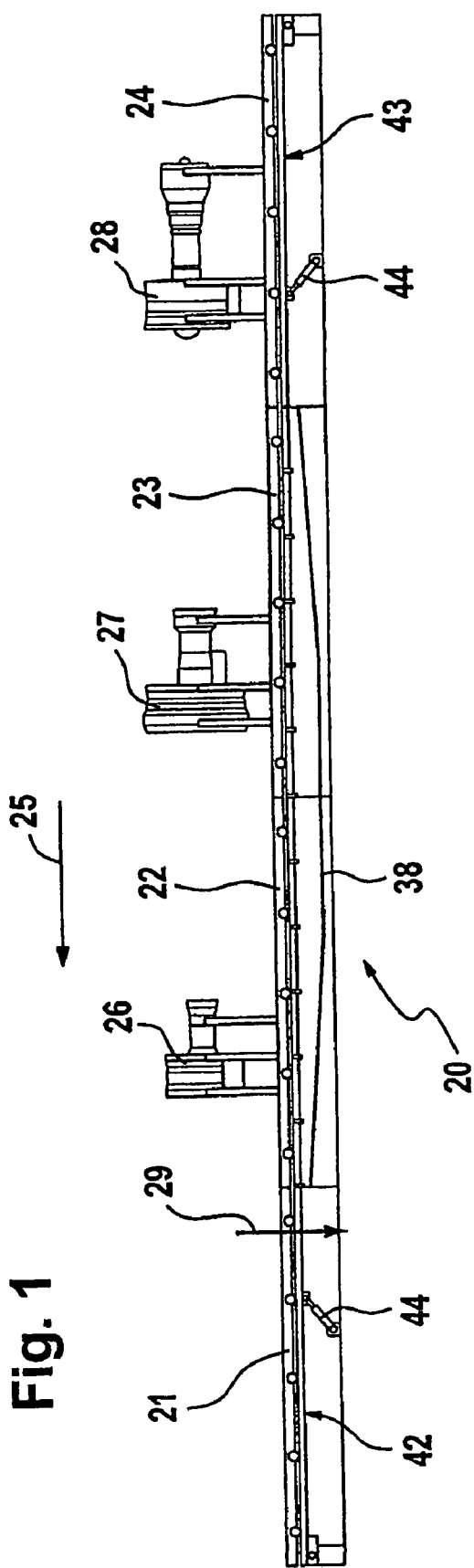
FIG. 1 shows a schematic side view of a device according to the present invention for displacing aircraft engines or aircraft engine modules during maintenance thereof, having three aircraft engines positioned on the device, in a first state.
Figure 10:
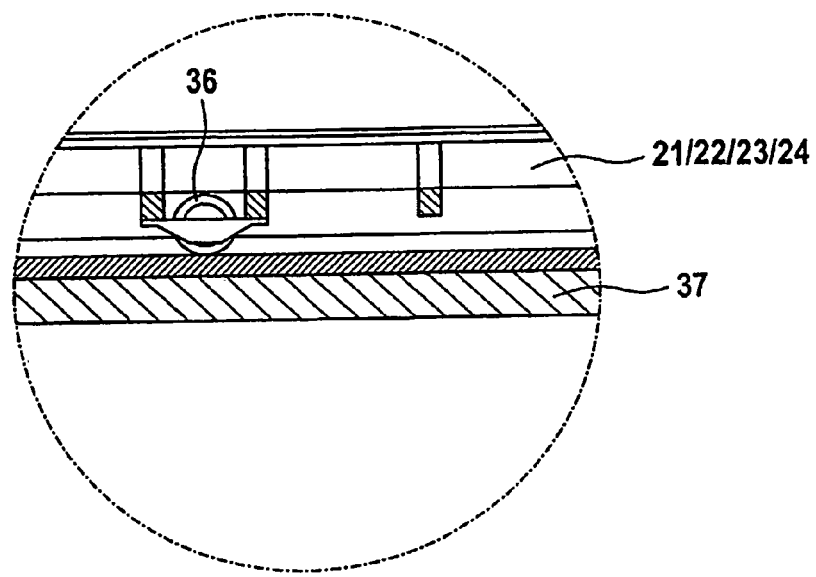
FIG. 10 shows a schematic side view of another detail of the device of FIGS. 1 through 5.

FIGS. 1 through 5 show a device 20 according to the present invention which has a total of four consecutive conveying platforms 21, 22, 23, and 24. An arrow 25 indicates a main direction of conveyance of device 20 according to the present invention. In FIG. 1 conveying platform 21 situated in front in the direction of conveyance is free, i.e., unoccupied. An aircraft engine 26, 27, and 28 is positioned on each of conveying platforms 22, 23, and 24 positioned behind conveying platform 21 situated in front. Aircraft engines 26, 27, and 28 are moved with the help of device 20 according to the present invention through consecutive work stations, device 20 according to the present invention being positioned in the area of a disassembly line in the exemplary embodiment of FIG. 1, which results in aircraft engines 26, 27, and 28 being disassembled into modules as they are moved through the consecutive work stations according to FIG. 1. If, as shown in FIG. 1, four conveying platforms 21, 22, 23, and 24 are provided, four work stations are also available. It is obvious that the number of conveying platforms and work stations may be varied.

FIG. 1 shows the resting position of device 20 according to the present invention in which the device stands still. In this state all conveying platforms 21 through 24 lie in one plane. If aircraft engines 26, 27, and 28 are to be moved in the main direction of conveyance, conveying platform 21, situated in front in the main direction of conveyance, is cleared. This means that in the case where device 20 according to the present invention is situated in a disassembly line of the aircraft engine, the disassembly of an aircraft engine into individual modules is completed in the area of the front work station at which front conveying platform 21 is situated. After front conveying platform 21 in the direction of conveyance is cleared, it is lowered as indicated by arrow 29.

Lowered conveying platform 21 is thus movable below the plane formed by conveying platforms 21, 22, 23, and 24 in the resting state, against the main direction of conveyance as indicated by arrow 30 (see FIG. 2). A front section of the front work station is cleared by lowering and moving backward conveying platform 21 originally lying in the front in the main direction of conveyance.

Conveying platforms 22, 23, and 24, situated behind lowered conveying platform 21, which is moved against the main direction of conveyance, are thus movable in the main direction of conveyance. This is apparent in particular from FIG. 3. Thereby each conveying platform 22, 23, and 24 is moved forward in the main direction of conveyance by one work station. Conveying platform 22 thus fills the section cleared by conveying platform 21 originally in the front. The work station in the rear in the main direction of conveyance is cleared as a result of each of consecutive conveying platforms 22, 23, and 24 being moved forward by one work station, i.e., conveying platform 24 originally in the rear in the main direction of conveyance clears a section within a work station, also in the rear. During the movement of conveying platforms 22, 23, and 24 in the main direction of conveyance, lowered conveying platform 21, previously moved against the main direction of conveyance remains in its position.

By further moving lowered conveying platform 21 against the main direction of conveyance according to arrow 31 and subsequently raising it according to arrow 32, lowered conveying platform 21, originally in front, is movable into the section within the rear work station, cleared by conveying platform 24, originally in the rear. This section is then occupied by platform 21. This is apparent in particular from FIGS. 4 and 5. An aircraft engine is then positionable on conveying platform 21 at the work station in the rear in the main direction of conveyance. The disassembly of the aircraft engine into modules is then begun at the work station in the rear in the main direction of conveyance.

Aircraft engines are thus movable via the device according to the present invention through a plurality of consecutive work stations, the work stations being usable for stepwise disassembly, repair, or also assembly of the aircraft engines. Conveying device 20 makes discontinuous movement of the aircraft engines in the main direction of conveyance possible, i.e., the aircraft engines are moved at a predefined pace through the work stations. The cycle in which the aircraft engines are moved through the work stations, i.e., in which the conveying platforms are moved, is preferably sixteen hours or twelve hours. The device stands still between two cycles, i.e., remains in a resting state (see FIG. 1). Work may be performed on the aircraft engines at the particular work stations within those sixteen or twelve hours. The time needed for displacing the aircraft engines, i.e., conveying platforms, is short compared to the cycle time. Thus a displacement cycle as shown in FIGS. 1 through 5 takes approximately twenty minutes.

Device 20 according to the present invention is preferably embedded into a floor 33 of a workshop in such a way that the plane in which conveying platforms 21, 22, 23, and 24 lie in a resting condition lies in the plane of floor 33. This is apparent in particular from FIGS. 6, 7, and 13 through 15. This ensures free access to conveying platforms 21, 22, 23, and 24 in the resting state. Workers who must step onto conveying platforms 21 through 24 for performing disassembly, repair, or assembly work may step from floor 33 of the workshop onto conveying platforms 21 through 24 without impediment. This increases occupational safety.

Figure 11:
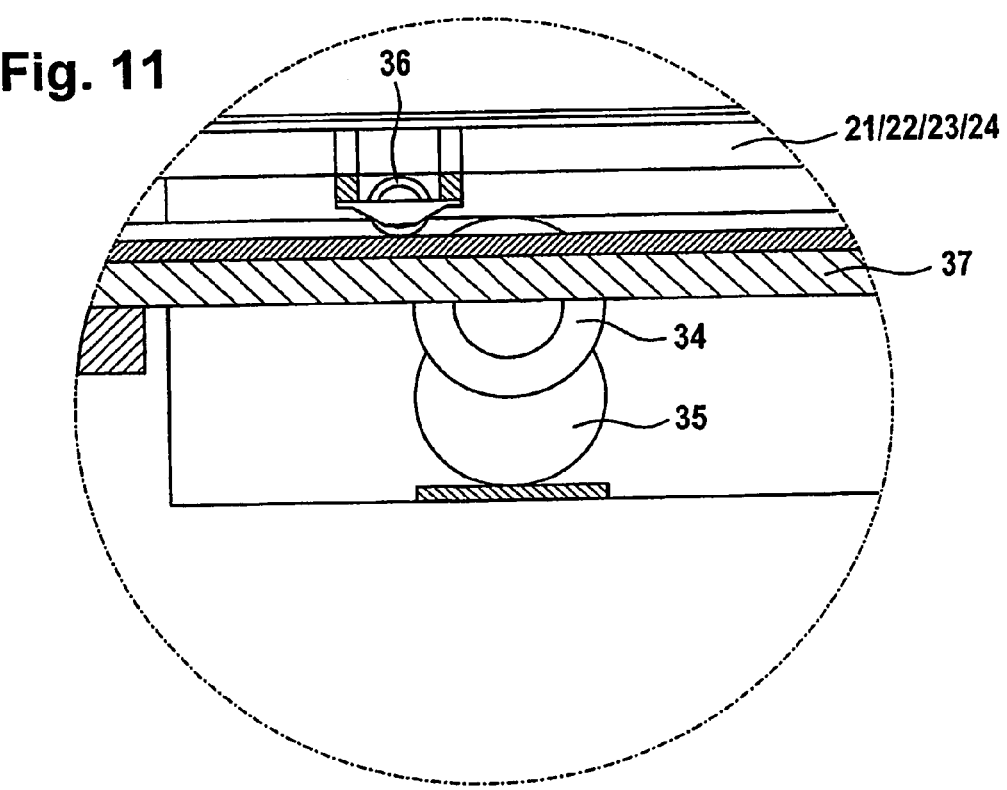
FIG. 11 shows a schematic side view of another detail of the device of FIGS. 1 through 5.

Device 20 according to the present invention has a first drive device for moving conveying platforms 21 through 24, preferably together with aircraft engines 26, 27, and 28 positioned on conveying platforms 21 through 24, in the main direction of conveyance. The first drive device for moving conveying platforms 21 through 24 includes a plurality of friction wheels 34. Such a friction wheel 34 is illustrated in FIG. 11. Friction wheel 34 is driven by an associated motor 35 and transmits the drive power of motor 35 to conveying platforms 21, 22, 23, and 24. At least one friction wheel 34 of this type is situated in the area of each work station. This ensures that, as conveying platforms 21 through 24 move in the main direction of conveyance, at least one active friction wheel 34 is available to each conveying platform 21 through 24. Preferably at least one of the friction wheels is provided on each side of conveying platforms 21 through 24.

To enable simple movement of conveying platforms 21 through 24 in the main direction of conveyance, multiple running wheels 36 are assigned to conveying platforms 21 through 24, in particular along their longitudinal sides. These running wheels are shown, for example, in FIGS. 6, 7; 10, 11. As apparent in particular from FIGS. 10 and 11, running wheels 36 run on guide rails 37 or guide bars, which extend in particular on both sides of conveying platforms 21 through 24. This enables reliable guidance of conveying platforms 21 through 24 and also allows conveying platforms 21 through 24 to move in the main direction of conveyance with low resistance.

To move a lowered conveying platform 21 against the main direction of conveyance, device 20 according to the present invention has a second drive device. The second drive device is designed as a chain conveyor 38. Chain conveyor 38 is illustrated in FIGS. 6 through 9 in particular.

Chain conveyor 38 extends over the entire area of the work stations situated between the work station in the front in the main direction of conveyance and the work station in the rear in the main direction of conveyance. Chain conveyor 38 extends at least in some sections in the area of the work station in the front in the main direction of conveyance and the work station in the rear in the main direction of conveyance. This is apparent in particular in FIGS. 6 and 7. Chain conveyor 38 includes a conveyor chain 40 rotating according to arrow 39. Deflecting rollers 41 for conveyor chain 40 are situated in the area of the work station in the front in the main direction of conveyance and the work station in the rear in the main direction of conveyance. Therefore, a lowered conveying platform 21 is movable by chain conveyor 38 against the main direction of conveyance below other conveying platforms 22 through 24.

It should be pointed out here that the first drive device for moving conveying platforms 21 through 24 in the main direction of conveyance should not exceed an speed value of approximately 2 m/min. For the second conveying device for moving lowered conveying platforms against the main direction of conveyance, speed values of up to 4 m/min are possible. Therefore, the second conveying device permits faster displacement of the conveying platforms than the first conveying device.

As apparent from FIGS. 8 and 9 in particular, one of friction wheels 34 is also positioned in the area of deflecting roller 41. Thus, FIG. 8 shows how a conveying platform 21 to be moved, located in the area of the work station in the rear in the main direction of conveyance, is just engaged by respective friction wheel 34. FIG. 9 shows the same system as FIG. 8, but with a conveying platform 21 moved against the main direction of conveyance into the work station in the rear in the main direction of conveyance. Friction wheels 34 are therefore positioned at an end in the front in the main direction of conveyance of the particular work stations; thus, conveying platforms 21 through 24 are in contact with friction wheels 34 over the entire distance to be traveled.

To raise or lower conveying platforms, which are to be transported against the main direction of conveyance, device 20 according to the present invention has lifting devices. A first lifting device 42 is positioned in the area of the work station in the front in the main direction of conveyance. A second lifting device 43 is positioned in the area of the work station in the rear in the main direction of conveyance. First lifting device 42 is best illustrated in FIG. 6. Second lifting device 43 is shown in FIG. 7 in two different positions, namely in a first lowered position and in a second raised position. Lifting devices 42, 43 are lowered and raised with the aid of lift cylinders 44 associated with lifting devices 42, 43. Lift cylinders 44 are preferably designed as hydraulic cylinders.

Figure 12:
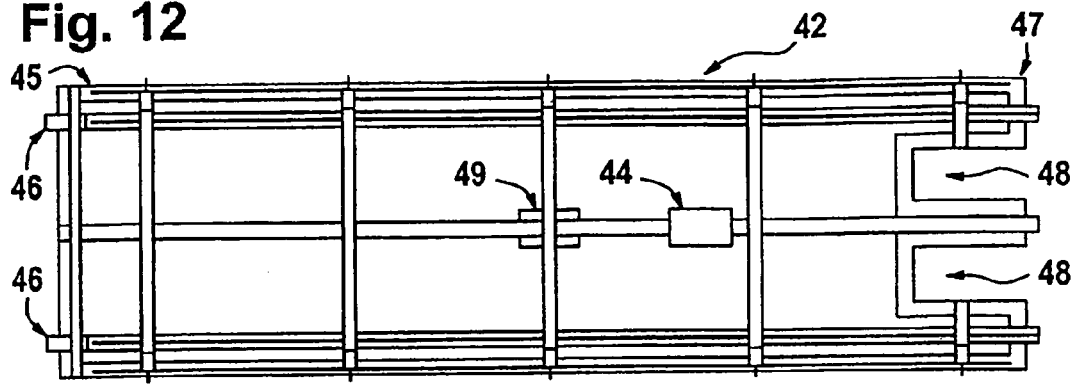
FIG. 12 shows a schematic side view of a lifting device of the device according to the present invention according to FIGS. 1 through 5 from below.
Figure 13:
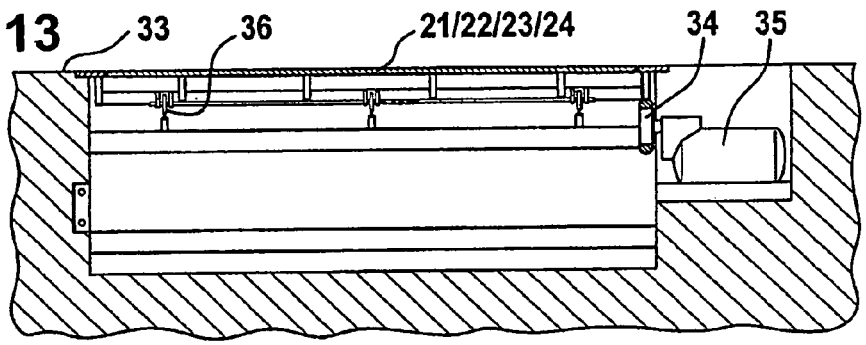
FIG. 13 shows a cross section of the device according to the present invention.
Figure 14:
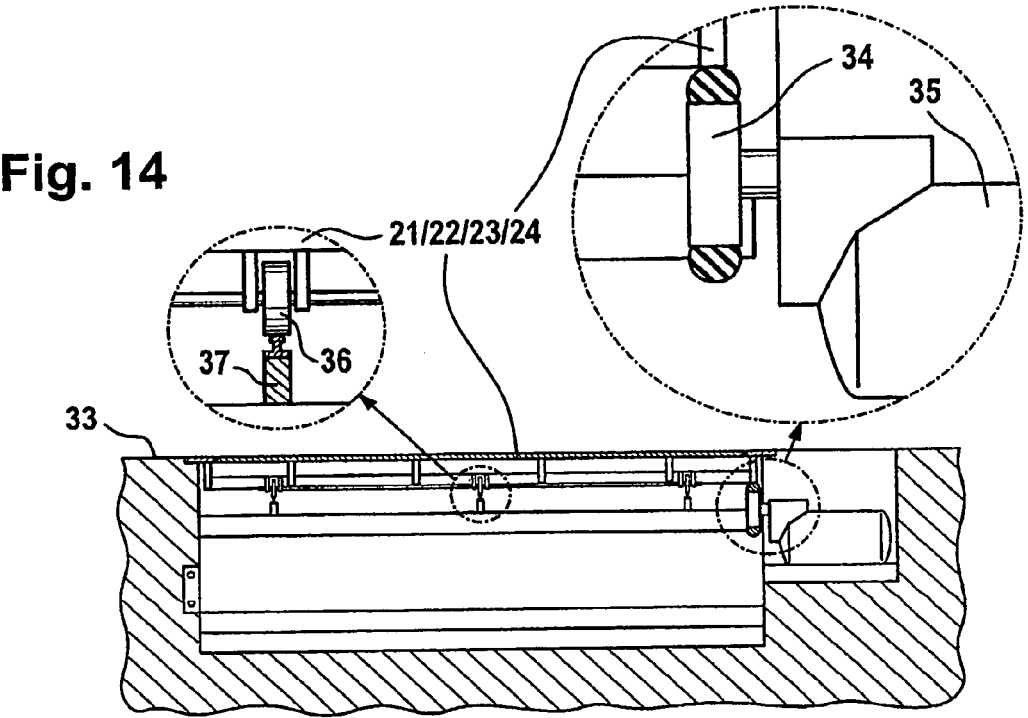
FIG. 14 shows the detail of the cross section according to FIG. 13.
Figure 15:
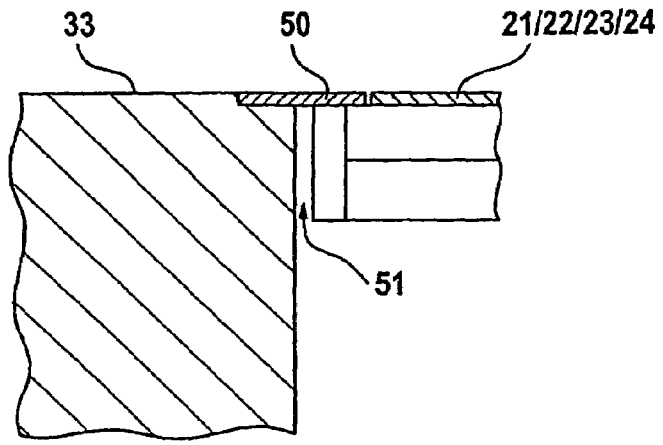
FIG. 15 shows another detail of the cross section according to FIG. 13.

Lifting device 42 in the front in the main direction of conveyance is shown in FIG. 12 in a view from below. Next to floor 33 (see FIG. 6), a first end 45 of lifting device 42 has pivot bearings 46. First end 45 of lifting device 42 is pivotably attached to floor 33 via pivot bearings 46 and is pivotable about pivot bearing 46 upon operation of lift cylinder 44. End 47, opposite end 45 of lifting device 42, has recesses 48. Chain conveyor 38 extends into recesses 48. This ensures that a lowered conveying platform 21 is immediately engaged by chain conveyor 38. To prevent uncontrolled movement of a lowered conveying platform due to the force of gravity, a braking device 49 for a conveying platform is assigned to a mid-section of lifting device 42.

It is furthermore within the scope of the present invention that gaps between conveying platforms 21, 22, 23, 24, and floor 33 of the workshop are minimized. This is apparent in particular from FIG. 15. This ensures that, when workers step on conveying platforms 21 through 24 for performing work steps on the aircraft engines, neither tools nor disassembled parts of the aircraft engine may fall through gaps into an area below conveying platforms 21 through 24. According to FIG. 15, a cover 50 situated in the plane of floor 33 or the plane of conveying platforms 21 through 24 is provided for this purpose between the actual conveying platform 21 through 24 and floor 33. Cover 50 covers a gap 51 between work platforms 21 through 24 and floor 33. Therefore, falling tools or parts of an aircraft engine are caught by cover 50 and are not able to drop into gap 51.

According to a further aspect of the present invention, a surface of conveying platforms 21 through 24 is provided with an anti-slip coating. In disassembling or performing other work on aircraft engines, lubricants and other liquids, such as oil and kerosene, may come out of the aircraft engine. The anti-slip coating of the surface of conveying platforms 21 through 24 ensures that even if oil or kerosene comes out of the aircraft engine, workers have secure footing on the conveying platform. Conveying platforms 21 through 24 are preferably twelve meters long and four meters wide.

Figure 16:
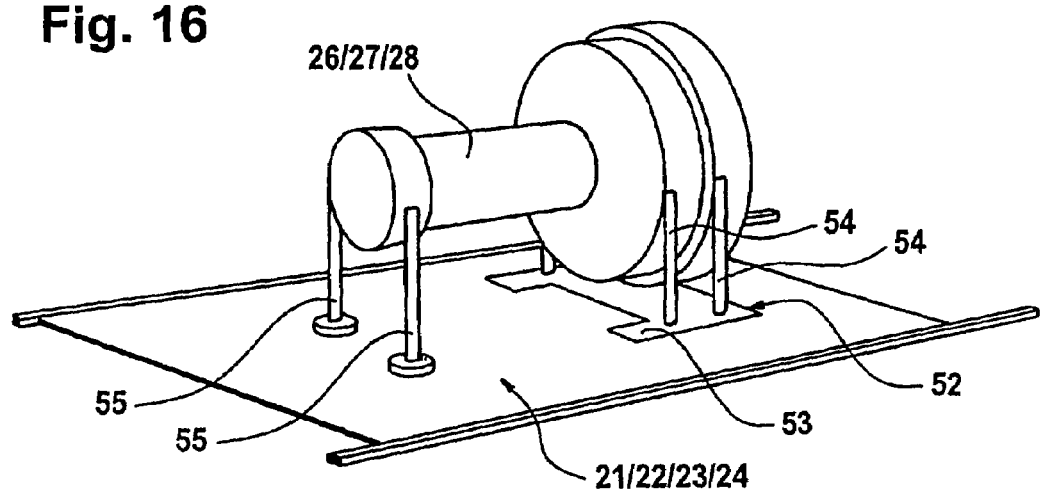
FIG. 16 shows a highly simplified perspective view of a detail of the device according to the present invention.

FIG. 16 shows a perspective view of a conveying platform 21 through 24 having an aircraft engine 26 through 28 positioned on the conveying platform. The aircraft engine is held on the conveying platform by an adapter 52. Adapter 52 is mounted in a mount area 53 of the conveying platform. Adapter 52 has a total of four props 54. Two of these props 54 are situated on either side of the aircraft engine. The position and spacing of props 54 in mount area 53 is individually adaptable to the particular type of aircraft engine. This makes it possible to mount different types of aircraft engines on conveying platforms 21 through 24. Props 54 are assigned to a front area of the engine. A rear area of the engine is supported by two conventional props 55.

Figure 17:
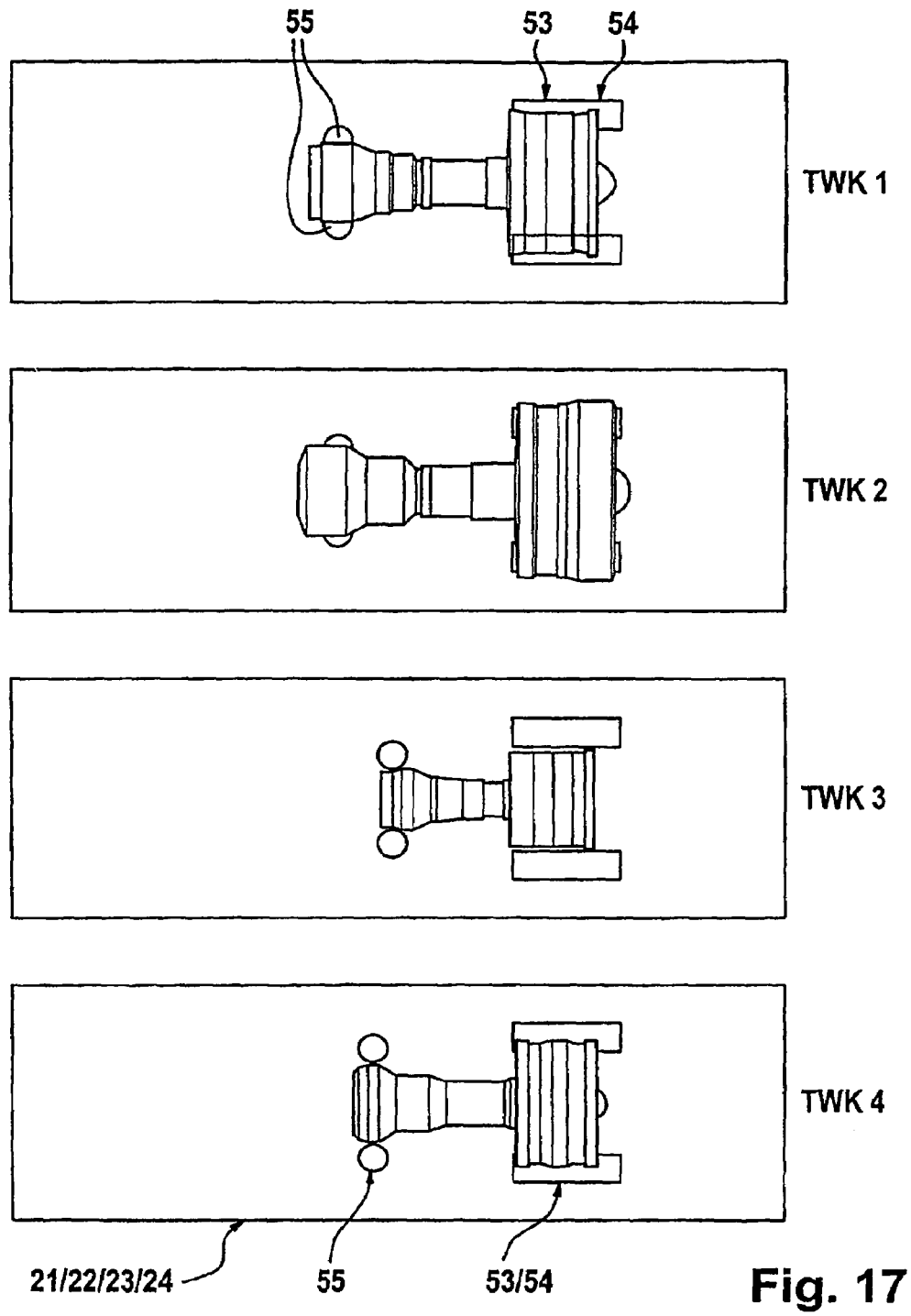
FIG. 17 shows different types of aircraft engines positionable on the device according to the present invention.

FIG. 17 illustrates that different engine types may be positioned on conveying platforms 21 through 24. Thus, FIG. 17 shows four conveying platforms, a different aircraft engine TWK1, TWK2, TWK3 or TWK4 being situated on each of these conveying platforms. The aircraft engine types are standard engines and are known to those skilled in the art. FIG. 17 shows the different dimensions of the different aircraft engine types and their different applications of force to conveying platforms 21 through 24. Furthermore, FIG. 17 also shows that both front props 54 and rear props 55 may be situated in different positions on conveying platforms 21 through 24.

The device according to the present invention allows reliable and safe movement of aircraft engines to be serviced through consecutive work stations. The device according to the present invention renders possible servicing or maintenance of aircraft engines according to the assembly line principle. The method according to the present invention may be carried out with the aid of the device according to the present invention. The device according to the present invention has a simple design. It is implementable in a cost-effective manner.

What is claimed is:

1. A device for displacing gas turbines or gas turbine modules, comprising:
   one or more adapters comprising two pairs of props adapted to be adjustably situated on opposite sides of a gas turbine;
   a plurality of consecutive conveying platforms, wherein each of the conveying platforms has a mounting area for one of the adapters, the adapter being mountable in the mounting area and being adaptable to different types of gas turbines or gas turbine modules, wherein at least one gas turbine or gas turbine module can be positioned on the adapter of each of the conveying platforms, and each gas turbine or gas turbine module is movable by moving the consecutive conveying platforms.

2. The device as recited in claim 1, further comprising:
   a plurality of consecutive work stations; and
   a first drive device for moving the conveying platforms through the plurality of consecutive work stations in a main direction of conveyance.

3. The device as recited in claim 2, wherein the conveying platforms are moved together with at least one gas turbine or gas turbine module positioned on at least one of the conveying platforms.

4. The device as recited in claim 3, further comprising:
   a second drive device for moving the conveying platforms against a main direction of conveyance of the gas turbines or gas turbine modules.

5. The device as recited in claim 2, further comprising:
   a second drive device for moving the conveying platforms against a main direction of conveyance of the gas turbines or gas turbine modules.

6. The device as recited in claim 1, further comprising:
   a second drive device for moving the conveying platforms against a main direction of conveyance of the gas turbines or gas turbine modules.

7. The device as recited in claim 1, wherein the conveying platforms are in one plane in a resting state.

8. The device as recited in claim 7, wherein, for moving the conveying platforms in a main direction of conveyance of the gas turbines or gas turbine modules, a front one of the conveying platforms, located in front of the remaining ones of the conveying platforms in the main direction of conveyance, is lowerable and movable below the plane against the main direction of conveyance such that a front section is cleared and the remaining ones of the conveying platforms situated behind the lowered front one of the conveying platforms are movable in the main direction of conveyance.

9. The device as recited in claim 8, wherein the lowered front conveying platform, which was moved below the plane against the main direction of conveyance, is liftable after the forward movement of the remaining conveying platforms in the main direction of conveyance in such that a section cleared by a rear one of the remaining conveying platforms can be occupied by the front conveying platform.

10. The device as recited in claim 1, further comprising:
    a first drive device for moving conveying platforms in the main direction of conveyance, the first drive device including a plurality of friction wheels, the friction wheels being positioned such that each conveying platform to be moved in the main direction of conveyance is in contact with at least one friction wheel.

11. The device as recited claim 1, further comprising
    a second drive device for moving the conveying platforms against the main direction of conveyance, the second drive device including a chain conveyor.

12. The device as recited in claim 1, wherein the device is embedded into a floor of a workshop such that a plane in which conveying platforms lie in a resting condition lies in a plane of the floor.

13. The device as recited in claim 1, further comprising:
    first and second lifting devices for lowering and lifting the conveying platforms, the first lifting device being positioned in an area of a first, front work station and the second lifting device being positioned in an area of a second, rear work station.

14. The device as recited in claim 1, wherein a surface of the conveying platforms has an anti-slip coating.

15. The device as recited in claim 1, wherein gaps between the conveying platforms and a floor are minimized such that neither tools nor parts of a gas turbine or gas turbine module can fall through the gaps into an area underneath the conveying platforms.

16. The device as recited in claim 1, wherein the conveying platforms are movable discontinuously.

17. The device as recited in claim 16, wherein the conveying platforms are movable stepwise at a predetermined pace.

18. A method for displacing gas turbines or gas turbine modules, comprising:
    mounting an adapter comprising two pairs of props adapted to be adjustably situated on opposite sides of a gas turbine in a mount area of one or more of a plurality of conveying platforms;
    positioning and spacing the adapter to mount different types of gas turbines or gas turbine modules;
    positioning a gas turbine or gas turbine module on the adapter in the mount area of each of one or more of a plurality of conveying platforms;
    moving the conveying platforms in a main direction of conveyance through a plurality of consecutive work stations such that each gas turbine or gas turbine module is moved by the movement of the conveying platforms.

19. The method as recited in claim 18, further comprising positioning the conveying platforms in one plane in a resting state.

20. The method as recited in claim 18, wherein, for moving the conveying platforms in the main direction of conveyance of the gas turbines or gas turbine modules, the method further comprises the steps of:
    lowering a front one of the conveying platforms, located in front of the remaining ones of the conveying platforms in the main direction of conveyance, below a plane of the remaining conveying platforms,
    moving said front one of the conveying platforms below the plane against the main direction of conveyance in such a way that a front section is cleared and the remaining ones of the conveying platforms situated behind the lowered front one of the conveying platforms are movable in the main direction of conveyance.

21. The method as recited in claim 19, further comprising:
    moving the remaining ones of the conveying platforms in the main direction of conveyance, and then
    lifting the lowered front conveying platform into a section cleared by a rear one of the remaining conveying platforms.

* * * * *